Patented Jan. 8, 1924.

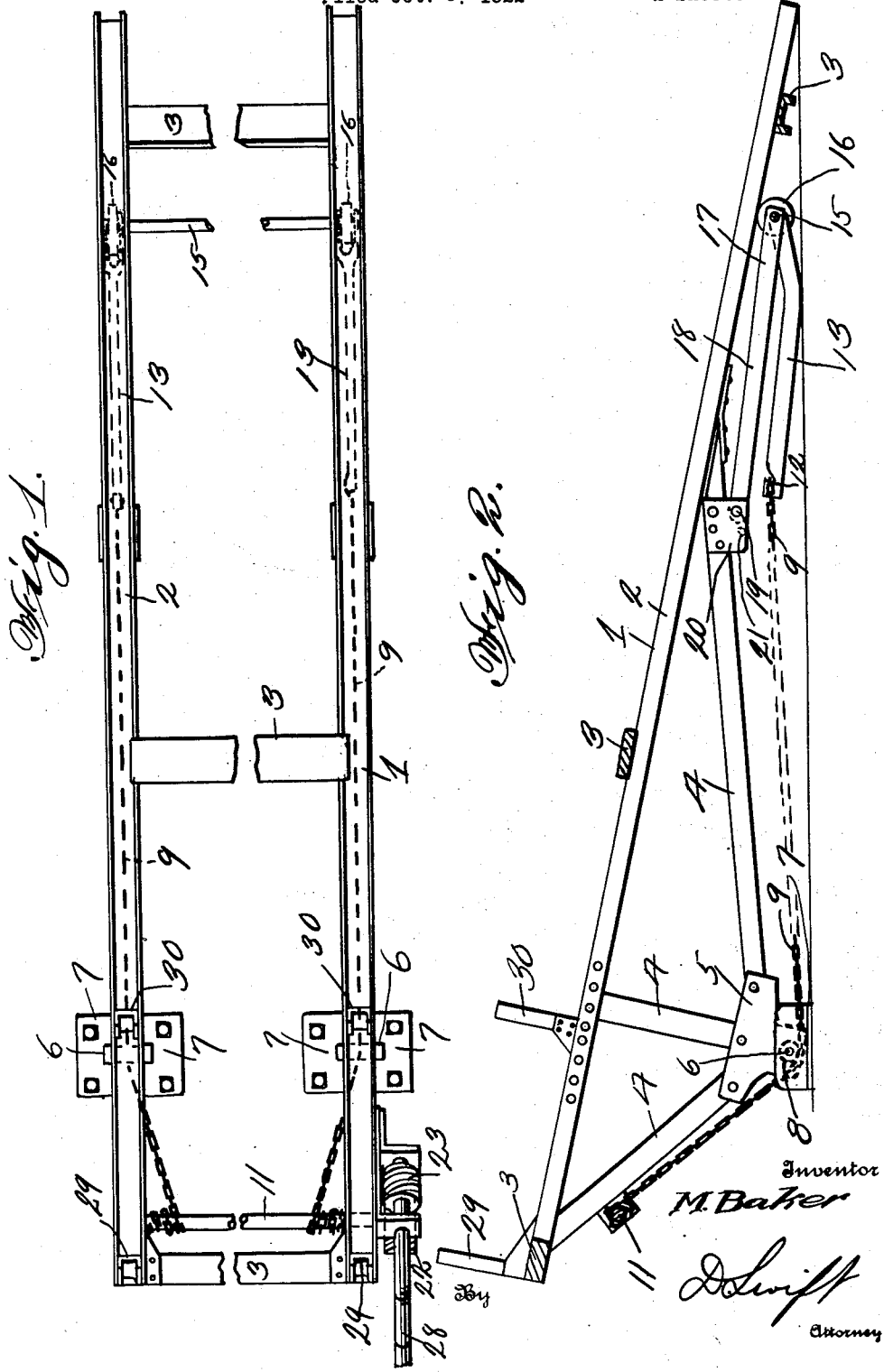

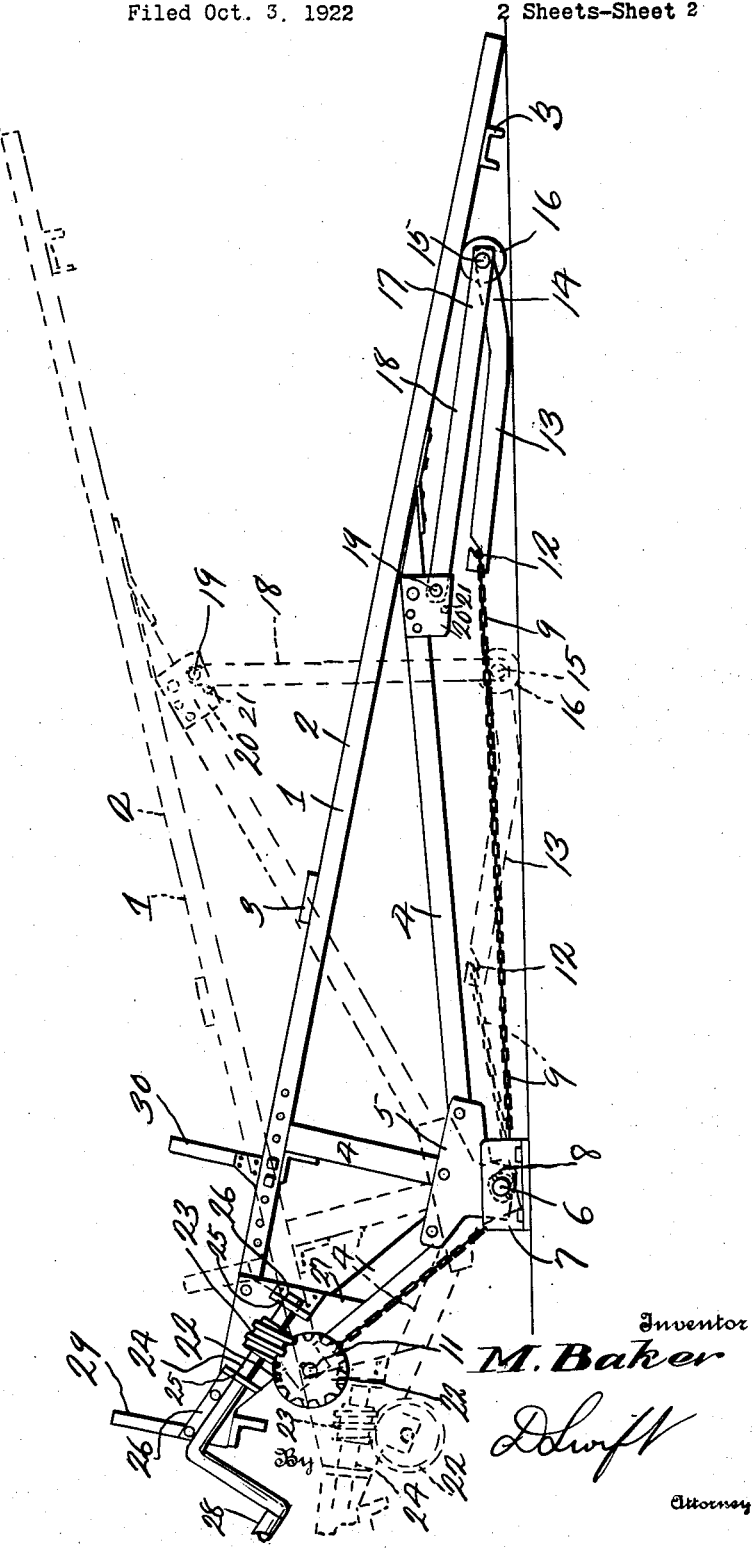

1,480,529

UNITED STATES PATENT OFFICE.

MYRON BAKER, OF WASHINGTON, DISTRICT OF COLUMBIA.

TILTABLE VEHICLE STAND.

Application filed October 3, 1922. Serial No. 592,050.

*To all whom it may concern:*

Be it known that I, MYRON BAKER, a citizen of the United States, residing at Washington, in the District of Columbia, have invented a new and useful Tiltable Vehicle Stand; and I do hereby declare the following to be a full, clear, and exact description of the invention, such as will enable others skilled in the art to which it appertains to make and use the same.

The invention relates to vehicle stands, and has for its object to provide a tiltable stand on which vehicles, preferably motor driven vehicles, may be placed and tilted to a position whereby a workman may work beneath the vehicle.

A further object is to provide a tiltable vehicle stand, said stand comprising a rectangular shaped frame having downwardly extending brackets at its longitudinal sides, which brackets are pivotally mounted in such a manner whereby the rectangular shaped frame may pivot in a vertical plane. Also to provide the rear end of the frame with an operating lever having a worm thereon, which worm meshes with a worm gear carried by a transversely disposed rotatable shaft. The transversely disposed rotatable shaft has secured thereto adjacent its ends chains, which chains extend downwardly over pulleys adjacent the pivotal point of the stand and forwardly, and have their ends connected to links, which links have their forward ends pivoted to supporting rollers carried by pivoted arms, which arms are forced rearwardly with the wheels in engagement with the ground and cause the forward end of the rectangular shaped frame to be forced upwardly after a vehicle has been placed thereon.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the device.

Figure 2 is a longitudinal sectional view through the device.

Figure 3 is a side elevation of the device.

Referring to the drawings, the numeral 1 designates a rectangular shaped frame, which frame comprises the side channels 2, and the transversely disposed bars 3, which bars connect the channels together. Channels 2 form runways on which the wheels of the vehicle, preferably a motor driven vehicle run, when the vehicle is being disposed on the device. Extending downwardly and converging towards each other from the under sides of the channels 2 are bars 4, which bars have their lower ends connected to plates 5, which plates are pivotally mounted on transversely disposed shafts 6 carried by floor engaging brackets 7. It will be seen that when the forward end of the frame 1 is tilted upwardly or downwardly, the device as a whole will pivot on the shafts 6. Rotatably mounted on the shafts 6 are rollers 8, over which rollers chains 9 pass. The rear ends of the cables 9 are anchored at 10 to a transversely disposed rotatable shaft 11, which is rotatably mounted in bearings adjacent the rear end of the frame. The forward ends of the chains 9 are connected at 12 to rearwardly extending links 13, which links extend downwardly and forwardly and have their ends 14 extending upwardly and forwardly and pivotally connected on the transversely disposed shaft 14. Rotatably mounted on the shaft 15 are supporting wheels 16, which wheels engage the floor during a tilting operation of the stand. Shaft 15 is carried by the ends 17 of pivoted arms 18, which arms are pivoted at 19 to plates 20 carried by the forward bars 4. It will be seen that when a pull is imparted on the chains 9 the links 13 will be moved rearwardly, thereby forcing the wheel 16 into engagement with the floor or ground and that the arms 18 will force the forward end of the rectangular shaped frame 1 upwardly thereby raising a vehicle disposed on the frame 1 to a position where a mechanic may work under the vehicle at the rear or forward ends of the vehicle. The rearward movement of the arms 18 is limited by stops 21 so that during a vehicle tilting operation the arms 18 cannot pass beyond a vertical position. Secured to one end of the shaft 11 is a gear 22, with which gear a worm 23 meshes. The worm 23 is carried by an operating shaft 24 which is rotatably mounted in bearings 25 of brackets 26 carried by the plate 27. It will be seen that when the operator grasps the handle member 28 and imparts a rotation to the shaft 4 that the transversely disposed shaft 11 will be rotated and the rear ends of the chains 9 will be wound on the shaft 11, thereby imparting a pull on the pivoted links 13, and consequently raising the forward end 8 of the tiltable frame 1. The worm and worm gear connection 23 and 24 prevent retrograde movement of the shaft 11 after the frame has been tilted to the desired position, as the pitch thereof prevents rotation until power is applied to the operating shaft 24. If so desired the operating shaft may be operated through an electric motor or in any other manner, other than manual as shown. Extending upwardly from the ends of the channels 2 are wheel engaging members 29, against which the wheels of the vehicle engage when placed on the device. After the wheels have been placed in engagement with the brackets 29, removable brackets 30 which are longitudinally adjustable on the channels 2 are placed in position behind the front wheels or rear wheels as the case may be and prevent movement of the vehicle on the tiltable frame.

From the above it will be seen that a vehicle tilting device is provided which is simple in construction, positive in operation and one which may be tilted to various angles and held at various angles or in a horizontal plane if desired, thereby allowing an operator to easily work underneath the vehicle. It will also be seen that the tilting mechanism is simple in construction, worm and gear operated, thereby allowing the frame to be easily and quickly tilted by a single operator.

The invention having been set forth what is claimed as new and useful is:—

1. A tiltable vehicle stand, said stand comprising a frame, on which a vehicle may be disposed, downwardly extending brackets carried by the sides of the frame, the lower ends of said brackets being pivotally mounted, forwardly extending pivoted arms carried by the frame and disposed beneath the frame, ground engaging wheels carried by the forwardly extending arms, rearwardly extending links pivoted to the forwardly extending arms, a transversely disposed rotatable shaft adjacent the rear end of the frame and rotatable in bearings thereof, worm and gear means for rotating said shaft, flexible members connecting the shaft and the rear ends of the rearwardly extending links, said flexible members extending downwardly to a point below the pivotal point of the stand and thence forwardly to the links.

2. A tiltable vehicle stand, said stand comprising a frame, downwardly extending members carried by the frame, said downwardly extending members being pivotally mounted, forwardly extending pivoted arms located below the frame at its sides, means connecting said arms together, supporting wheels carried by the forward ends of the arms, rearwardly extending drag links pivoted to the forward ends of the forwardly extending arms, a transversely disposed shaft rotatably mounted in bearings adjacent the rear end of the frame, an operating shaft rotatably mounted in bearings of the frame, a worm gear carried by the transversely disposed shaft, a worm carried by the operating shaft and meshing with the worm gear of the transversely disposed shaft and flexible members connecting the drag links and the transversely disposed shaft and adapted to be wound around the transversely disposed shaft for imparting a rearward movement to the wheels and an upward movement to the forward end of the frame.

3. The combination with a tiltable vehicle stand, said stand being pivotally mounted adjacent its rear end and below the vehicle receiving portion thereof, of means for tilting said stand by forcing the forward end thereof upwardly, said means comprising arms pivoted to the frame adjacent its forward end and extending forwardly, ground engaging wheels carried by said arms, rearwardly extending drag links carried by the forwardly extending arms and pivoted thereto, rearwardly extending flexible members connected to the rear ends of the drag links, said flexible members extending rearwardly below the pivotal point of the stand and thence upwardly and rearwardly, a transversely disposed rotatable shaft adjacent the rear end of the stand, the rear ends of the flexible members being connected to said shaft and adapted to be wound around the same and gear means for rotating said transversely disposed shaft.

4. The combination with a tiltable vehicle stand, of means for tilting said stand, said means comprising pivoted arms beneath the stand, ground engaging wheels carried by said arms, drag links pivoted to the forward ends of the arms adjacent the wheels, rearwardly extending flexible members connected to the drag links, a reel on which the rear ends of the flexible members may be wound and means for imparting rotation to the reel.

5. The combination with a tiltable pivoted vehicle stand pivoted adjacent its rear end, of means for controlling the upward and downward movement of the forward end of the stand, said means comprising arms pivoted beneath the forward end of the stand, ground engaging wheels carried by said arms and means for forcing and controlling the movement of the arms towards and away from a vertical position.

In testimony whereof I have signed my name to this specification in the presence of two subscribing witnesses.

MYRON BAKER.

Witnesses:
   Edw. Gordon,
   Alexander Berg.